(12) United States Patent
Li (10) Patent No.: US 9,256,024 B2
(45) Date of Patent: Feb. 9, 2016

(54) BACKLIGHT MODULE

(71) Applicant: Shenzhen China Star Optoelectronics Technology Co., Ltd., Shenzhen, Guangdong (CN)

(72) Inventor: Quan Li, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 12 days.

(21) Appl. No.: 14/360,611

(22) PCT Filed: Apr. 22, 2014

(86) PCT No.: PCT/CN2014/075993
§ 371 (c)(1),
(2) Date: May 23, 2014

(87) PCT Pub. No.: WO2015/135239
PCT Pub. Date: Sep. 17, 2015

(65) Prior Publication Data
US 2015/0260906 A1    Sep. 17, 2015

(30) Foreign Application Priority Data
Mar. 14, 2014 (CN) .......................... 2014 1 0096190

(51) Int. Cl.
*F21V 8/00* (2006.01)
(52) U.S. Cl.
CPC ............ *G02B 6/0088* (2013.01); *G02B 6/0023* (2013.01); *G02B 6/0085* (2013.01); *Y10S 977/774* (2013.01); *Y10S 977/952* (2013.01)

(58) Field of Classification Search
CPC ............................ G02B 6/0088; G02B 6/0023
See application file for complete search history.

(56) References Cited

U.S. PATENT DOCUMENTS

| | | | |
|---|---|---|---|
| 2008/0297695 A1* | 12/2008 | Sekiguchi et al. | 349/65 |
| 2010/0103648 A1* | 4/2010 | Kim et al. | 362/97.1 |
| 2011/0141769 A1* | 6/2011 | Lee et al. | 362/629 |
| 2012/0075837 A1* | 3/2012 | Um | 362/84 |
| 2013/0271700 A1* | 10/2013 | Nakamura et al. | 349/65 |
| 2014/0286049 A1* | 9/2014 | Cha et al. | 362/609 |

* cited by examiner

*Primary Examiner* — Elmito Breval
(74) *Attorney, Agent, or Firm* — Andrew C. Cheng (57) ABSTRACT

The present invention provides a backlight module, which includes a backplane (2) and a light guide plate (4), a backlight source (6), a mounting bracket (8), a quantum dot rail (10), and a heat isolation member (12) mounted in the backplane (2). The quantum dot rail (10) is fixedly mounted, via the mounting bracket (8), between the light guide plate (4) and the backlight source (6). The mounting bracket (8) is made of an aluminum material. The heat isolation member (12) is arranged between the quantum dot rail (10) and the mounting bracket (8). The present invention uses a mounting bracket made of an aluminum material to fix a backlight source for enhancing the effect of heat dissipation and also to fix the quantum dot rail for ensuring a desired effect of fixing and reducing cost. Further, a heat isolation member is arranged between the quantum dot rail and the mounting bracket to prevent the quantum dot rail from being affected by the heat emitting from the backlight source thereby guaranteeing the life span of the backlight module.

12 Claims, 9 Drawing Sheets

BACKLIGHT MODULE

BACKGROUND OF THE INVENTION

1. Field of the Invention

The present invention relates to the field of flat panel displaying, and in particular to a backlight module.

2. the Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module to generate images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Figure 1:
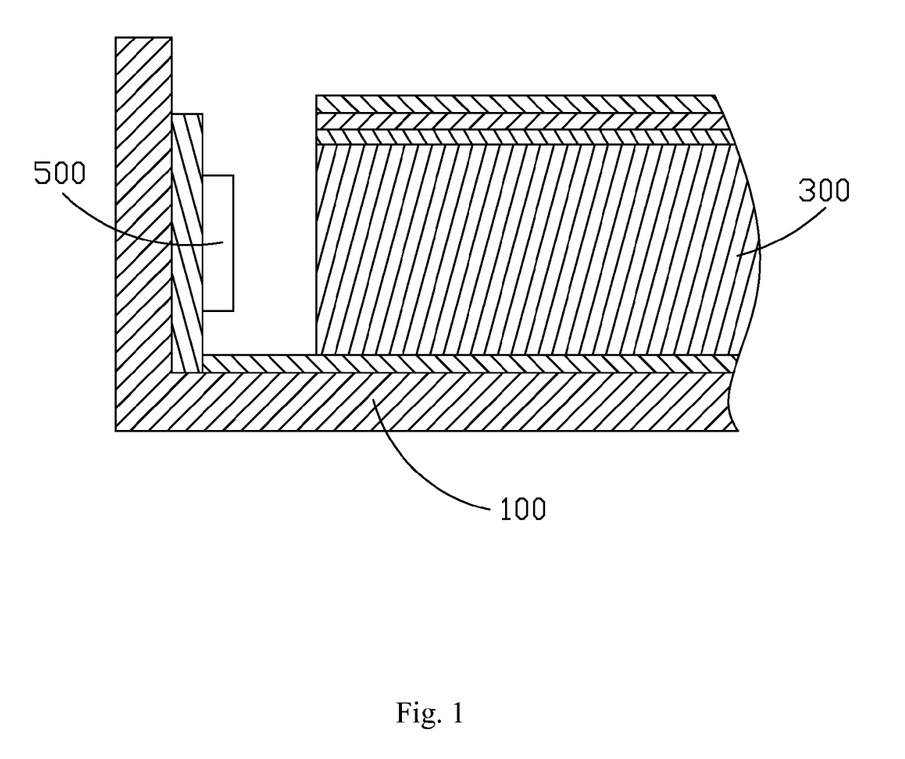
FIG. 1 is a cross-sectional view showing a conventional side-edge backlight module.

Referring to FIG. 1, a cross-sectional view is given to show a conventional side-edge backlight module, which comprises: a backplane 100, a light guide plate 300 arranged in the backplane 100, and a backlight source 500 arranged inside the backplane 100 and located beside the light guide plate 300. The backlight source 500 emits light that is converted by the light guide plate 300 into a planar light source supplied to a liquid crystal display panel.

With the development of the human society, the general consumers have increasingly high requirements for the quality of the image displayed by a liquid crystal display. For the purpose of improving color saturation of an image, improvement can be made on the chromaticity of the light bard of the backlight unit in order to enhance the image color saturation. A known solution is to install a quantum dot rail in the backlight module. In a conventional backlight module, the quantum dot rail is supported on a plastic frame; however, such a structure poses a severe requirement of the strength of the backplane, leading to an increased cost of the backplane and a weaker resistance against an external impact. Further, the quantum dot rail is susceptible to deterioration under high temperatures, making the quality thereof affected, so that it is required to have the temperature around the quantum dot rail reduced.

SUMMARY OF THE INVENTION

An object of the present invention is to provide a backlight module that effectively supports a quantum dot rail and can reduce the temperature around the quantum dot rail so as to extend the life span of the backlight module.

To achieve the above object, the present invention provides a backlight module, which comprises: a backplane and a light guide plate, a backlight source, a mounting bracket, a quantum dot rail, a heat isolation member mounted in the backplane. The quantum dot rail is mounted through the mounting bracket between the light guide plate and the backlight source. The mounting bracket is made of an aluminum material. The heat isolation member is arranged between the quantum dot rail and the mounting bracket.

The mounting bracket comprises a bottom plate, a side plate perpendicularly connected to the bottom plate, and a mounting plate extending upward from the bottom plate at a location close to the side plate. The backlight source is mounted to the side plate. The quantum dot rail is mounted to the mounting plate. The heat isolation member is arranged between the quantum dot rail and the mounting plate.

The mounting plate comprises a vertical section perpendicularly connected to the bottom plate and a horizontal section perpendicularly connected to a free end of the vertical section. The quantum dot rail is mounted between the bottom plate and the horizontal section. The vertical section comprises a plurality of openings formed therein to correspond to the backlight source.

The heat isolation member is made of an elastic thermal insulation material and parts thereof are respectively arranged between the quantum dot rail and the horizontal section and between the quantum dot rail and the bottom plate. The heat isolation member comprises hollow cavities formed therein.

The elastic thermal insulation material comprises silicone rubber or plastics.

The mounting bracket comprises a heat dissipation frame and a support frame mounted to the heat dissipation frame. The backlight source is mounted to the heat dissipation frame. The quantum dot rail is mounted to the support frame.

The support frame comprises a connection section and a mounting section perpendicularly connected to the connection section. The connection section is mounted to the heat dissipation frame. The quantum dot rail is mounted to the mounting section.

The heat isolation member comprises a plate-like body that is made of an elastic thermal insulation material and is arranged between the heat dissipation frame and the connection section of the support frame.

The elastic thermal insulation material comprises silicone rubber or plastics.

The heat isolation member comprises projections formed on a bottom surface of the connection section of the support frame. The projections are dot projections or strip projections.

The backlight module may further comprise a bottom reflector plate arranged between the light guide plate and the backplane and an optical film assembly arranged above the light guide plate.

The present invention also provides a backlight module, which comprises: a backplane and a light guide plate, a backlight source, a mounting bracket, a quantum dot rail, a heat isolation member mounted in the backplane, the quantum dot rail being mounted through the mounting bracket between the light guide plate and the backlight source, the mounting bracket being made of an aluminum material, the heat isolation member being arranged between the quantum dot rail and the mounting bracket;

wherein the mounting bracket comprises a bottom plate, a side plate perpendicularly connected to the bottom plate, and a mounting plate extending upward from the bottom plate at a location close to the side plate, the backlight source being mounted to the side plate, the quantum dot rail being mounted to the mounting plate, the heat isolation member being arranged between the quantum dot rail and the mounting plate.

The mounting plate comprises a vertical section perpendicularly connected to the bottom plate and a horizontal section perpendicularly connected to a free end of the vertical section. The quantum dot rail is mounted between the bottom plate and the horizontal section. The vertical section comprises a plurality of openings formed therein to correspond to the backlight source.

The heat isolation member is made of an elastic thermal insulation material and parts thereof are respectively arranged between the quantum dot rail and the horizontal section and between the quantum dot rail and the bottom plate. The heat isolation member comprises hollow cavities formed therein.

The elastic thermal insulation material comprises silicone rubber or plastics.

The efficacy of the present invention is that the present invention provides a backlight module, which comprises a mounting bracket made of an aluminum material to fix a backlight source for enhancing the effect of heat dissipation and also to fix the quantum dot rail for ensuring a desired effect of fixing and reducing cost. Further, a heat isolation member is arranged between the quantum dot rail and the mounting bracket to prevent the quantum dot rail from being affected by the heat emitting from the backlight source thereby guaranteeing the life span of the backlight module.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 2:
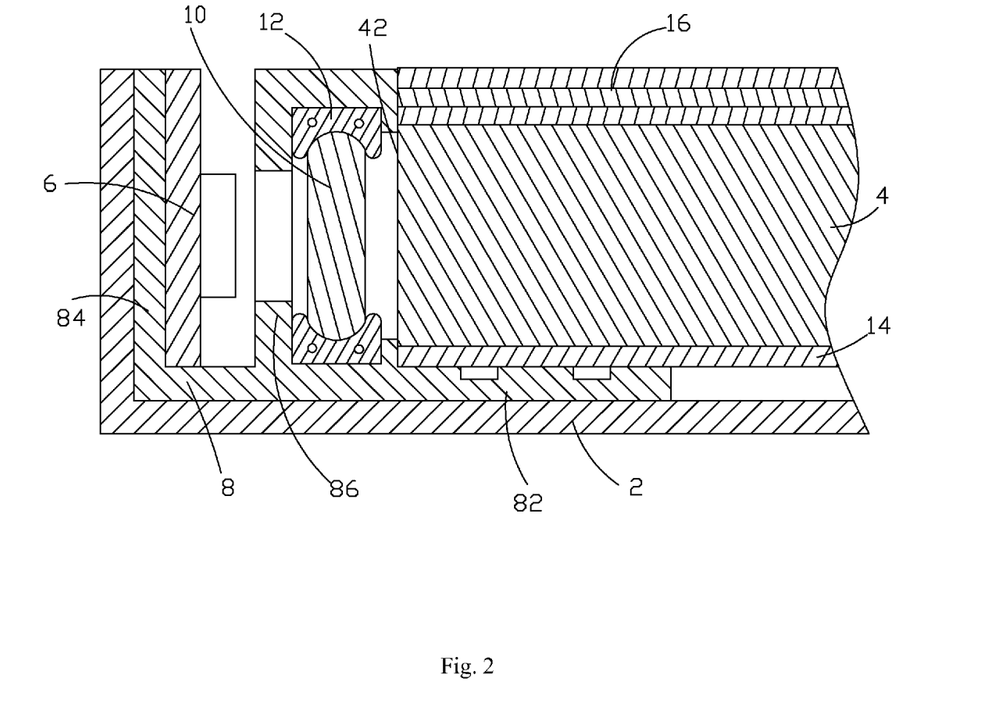
FIG. 2 is a cross-sectional view showing a backlight module according to a first embodiment of the present invention.
Figure 3:
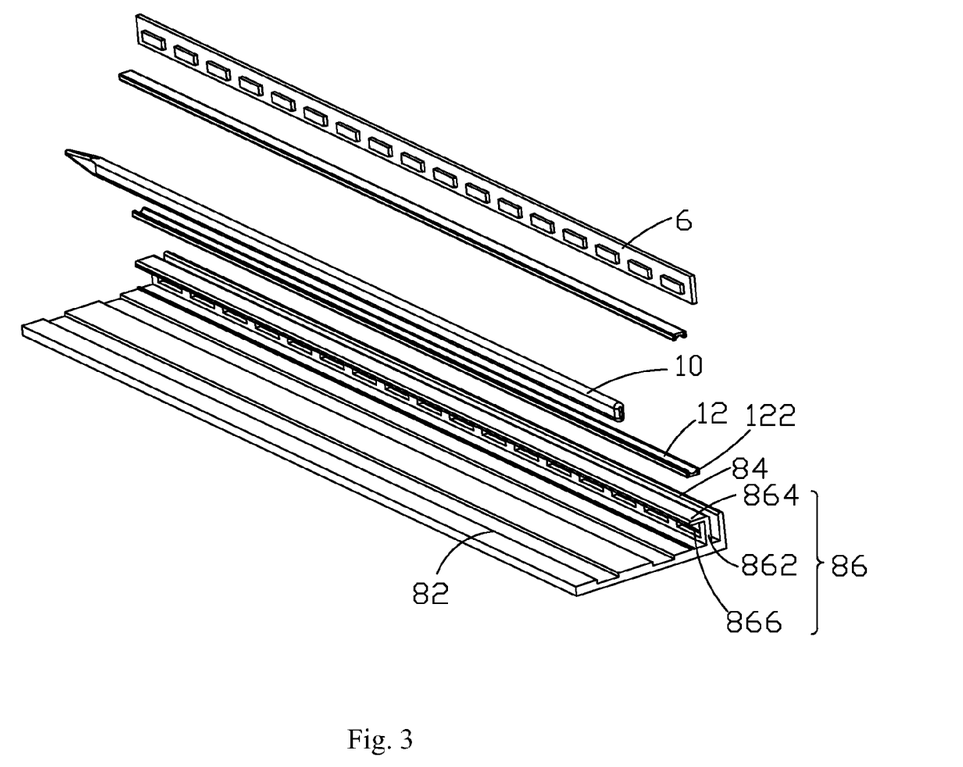
FIG. 3 is an exploded view showing a mounting bracket, a quantum dot rail, and a backlight source of the backlight module shown in FIG. 2.

Referring to FIGS. 2 and 3, the present invention provides a backlight module, which comprises: a backplane 2 and a light guide plate 4, a backlight source 6, a mounting bracket 8, a quantum dot rail 10, and heat isolation members 12 mounted in the backplane 2. The light guide plate 4 comprises at least one light exit surface 42 and the backlight source 6 is arranged at one side of the light guide plate 4 to correspond to the light exit surface 42. In the instant embodiment, the backlight source 6 is arranged beside the light guide plate 4 and mounted to the mounting bracket 8. The quantum dot rail 10 is fixedly mounted, via the mounting bracket 8, between the light guide plate 4 and the backlight source 6, whereby light emitting from the backlight source 6 transmits through the quantum dot rail 10 and then enters the light guide plate 4 to improve color saturation of the light and effectively enhance the optic effect of the backlight module. The mounting bracket 8 is made of an aluminum material to receive the backlight source 6 mounted thereon to enhance the heat dissipation performance and also to fix the quantum dot rail 10 in position so as to ensure the effect of fixing and reduce cost. Further, the heat isolation members 12 are arranged between the quantum dot rail 10 and the mounting bracket 8 to ensure that the quantum dot rail 10 is not affected by the heat emitting from the backlight source 6 to thereby guarantee the life span of the backlight module.

Referring to FIG. 3, the mounting bracket 8 comprises a bottom plate 82, a side plate 84 perpendicularly connected to the bottom plate 82, and a mounting plate 86 extending upward from the bottom plate 82 at a location close to the side plate. The backlight source 6 is mounted to the side plate 84 and the quantum dot rail 10 is mounted to the mounting plate 86. The heat isolation members 12 are arranged between the quantum dot rail 10 and the mounting plate 86.

Further, the mounting plate 86 comprises a vertical section 862 perpendicularly connected to the bottom plate 82 and a horizontal section 864 perpendicularly connected to a free end of the vertical section 862. The quantum dot rail 10 is mounted between the bottom plate 82 and the horizontal section 864. The vertical section 862 comprises a plurality of openings 866 formed therein to correspond to the backlight source 6. The light emitting from the backlight source 6 passes through the openings 866 to get incident to the quantum dot rail and then transmits into the light guide plate 4 to have the color saturation of the light improved.

In the instant embodiment, the heat isolation members 12 are made of an elastic thermal insulation material, preferably silicone rubber or plastics, and are respectively arranged between the quantum dot rail 10 and the horizontal section 864 and between the quantum dot rail 10 and the bottom plate 82. The portions of the heat isolation members 12 that are in contact with the quantum dot rail 10 are shaped to comply with the shape of the quantum dot rail 10. In the instant embodiment, the portions of the heat isolation members 12 that are in contact with the quantum dot rail 10 are made in a curved form to correspond to the shape of the quantum dot rail 10 in order to securely hold and fix the quantum dot rail 10 in position. Further, the heat isolation members 12 comprise hollow cavities 122 formed therein for effective thermal isolation to prevent heat from affecting the quantum dot rail. The hollow cavities 122 can be air-filled cavities and can be formed at the same time when the heat isolation members 12 are formed, or can alternatively be formed with a posterior operation, both achieving the technical effect of the present invention.

It is noted that the backlight module may further comprises a bottom reflector plate 14 arranged between the light guide plate 4 and the backplane 2 and an optical film assembly 16 arranged above the light guide plate 4.

Figure 4:
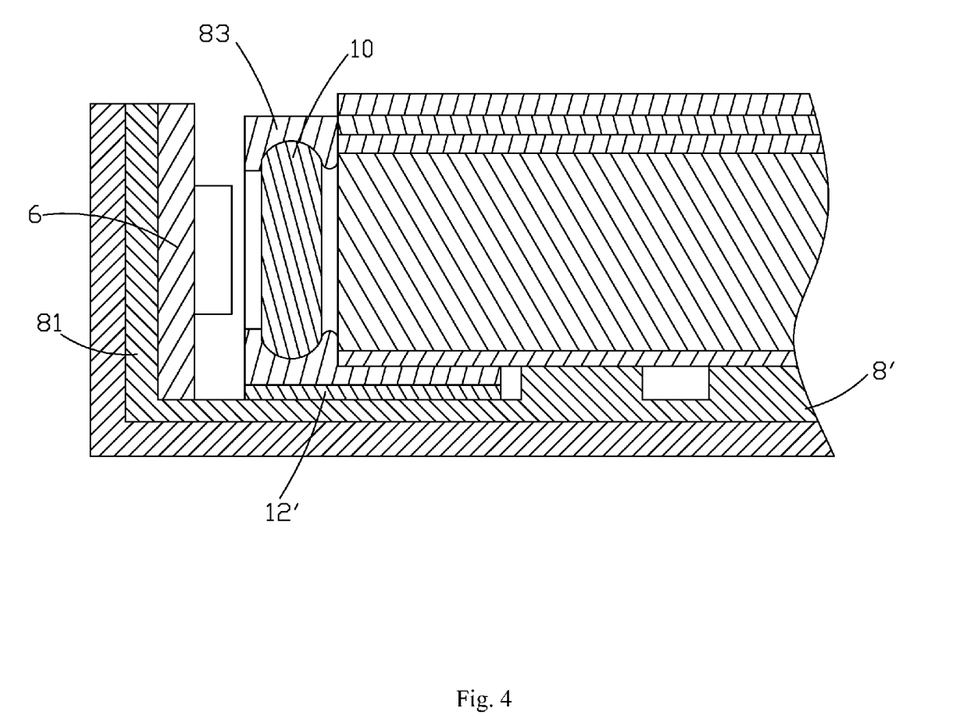
FIG. 4 is a cross-sectional view showing a backlight module according to a second embodiment of the present invention.
Figure 5:
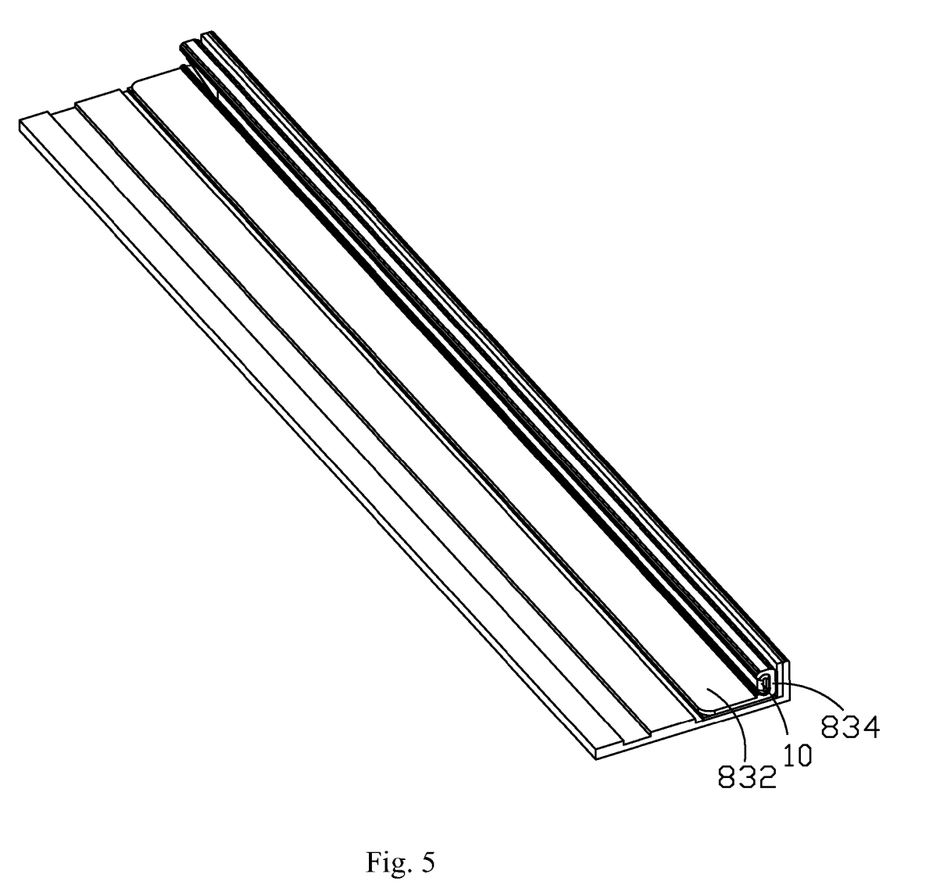
FIG. 5 is an exploded view showing a mounting bracket, a quantum dot rail, and a backlight source of the backlight module shown in FIG. 4.

Referring to FIGS. 4 and 5, schematic views are given to show a backlight module according to a second embodiment of the present invention. In the instant embodiment, the mounting bracket 8' comprises a heat dissipation frame 81 and a support frame 83 mounted to the heat dissipation frame 81. The backlight source 6 is mounted to the heat dissipation frame 81 and the quantum dot rail 10 is mounted to the support frame 83.

Specifically, the support frame 83 comprises a connection section 832 and a mounting section 834 perpendicularly connected to the connection section 832. The connection section 832 is mounted to the heat dissipation frame 81 and the quantum dot rail 10 is mounted to the mounting section 834.

In the instant embodiment, a heat isolation member 12' is made of an elastic thermal insulation material, preferably silicone rubber or plastics, and is arranged between the heat dissipation frame 81 and the connection section 832 of the support frame 83.

Figure 6:
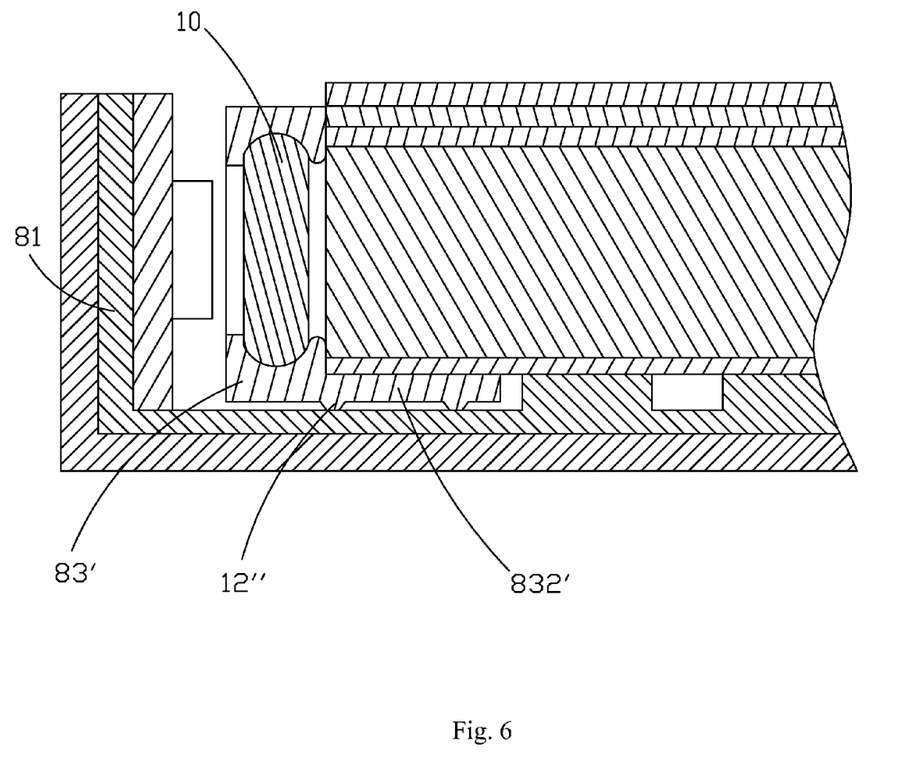
FIG. 6 is a cross-sectional view showing a backlight module according to a third embodiment of the present invention.
Figure 7:
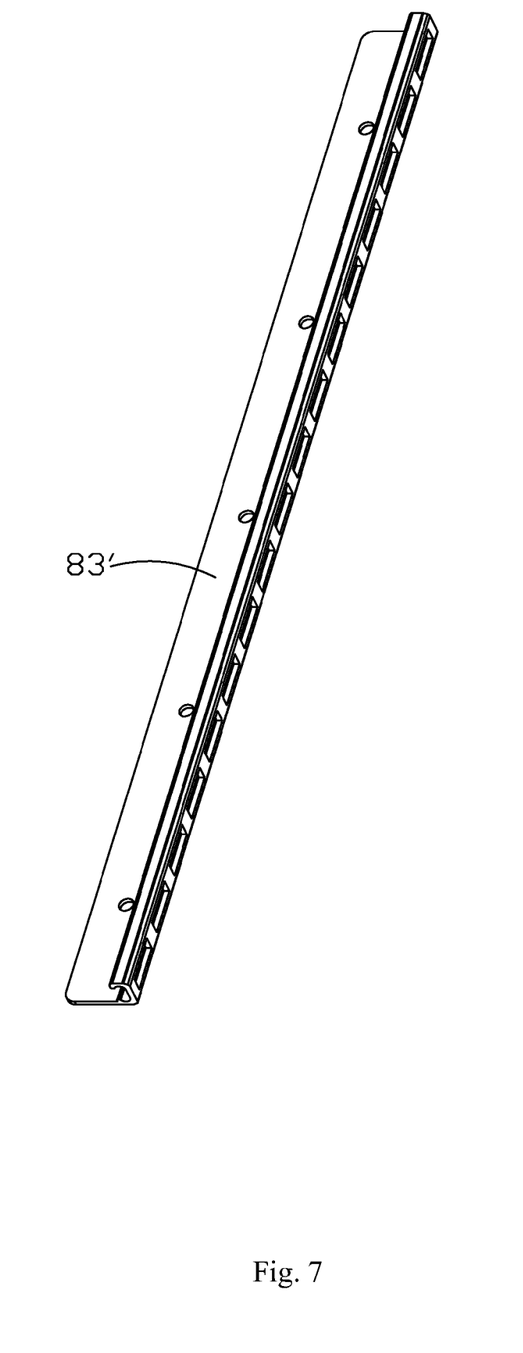
FIG. 7 is a perspective view showing a support frame of the backlight module shown in FIG. 6.

Referring to FIGS. 6 and 7, schematic views are given to show a backlight module according to a third embodiment of the present invention. In the instant embodiment, the heat isolation member 12" comprises projections formed on a bottom surfaces of the connection section 832' of the support frame 83'. The support frame 83' is secured, with the through holes 830 formed in the support frame 83', to the heat dissipation frame 81 in such a way that the projection-included bottom surface thereof are set in engagement with the heat dissipation frame 81. Due to the arrangement of the projections, heat conduction area is effectively reduced to prevent heat from being transmitted from the heat dissipation frame 81 to the support frame 83' in order to achieve thermal insulation and protection of the quantum dot rail 10.

Figure 8:
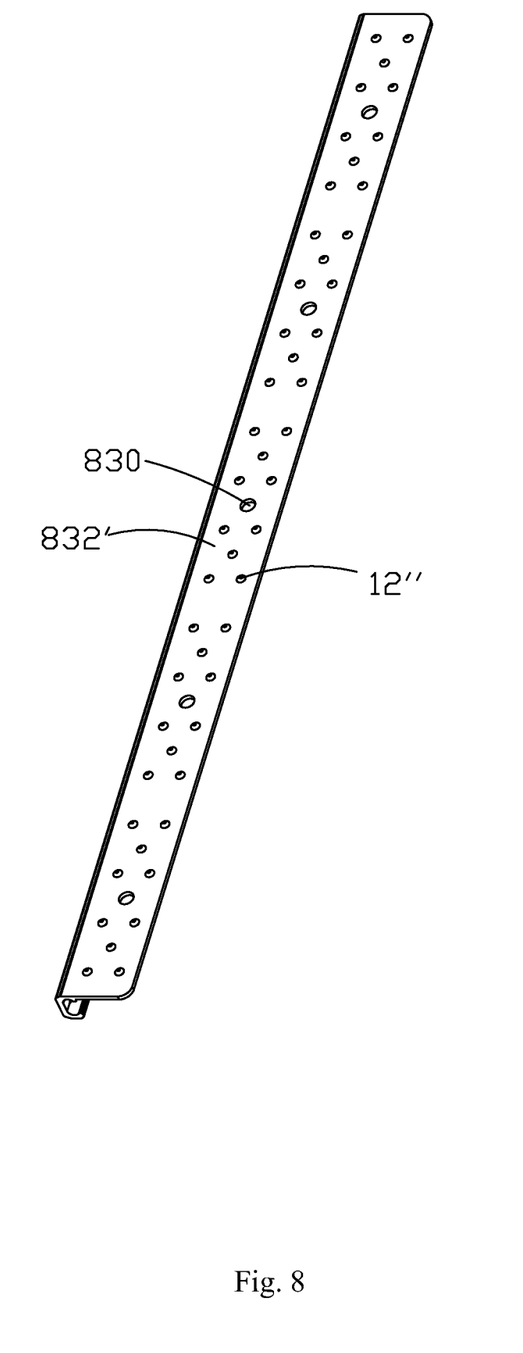
FIG. 8 is a perspective view showing a dot projection included support frame of the backlight module shown in FIG. 6.
Figure 9:
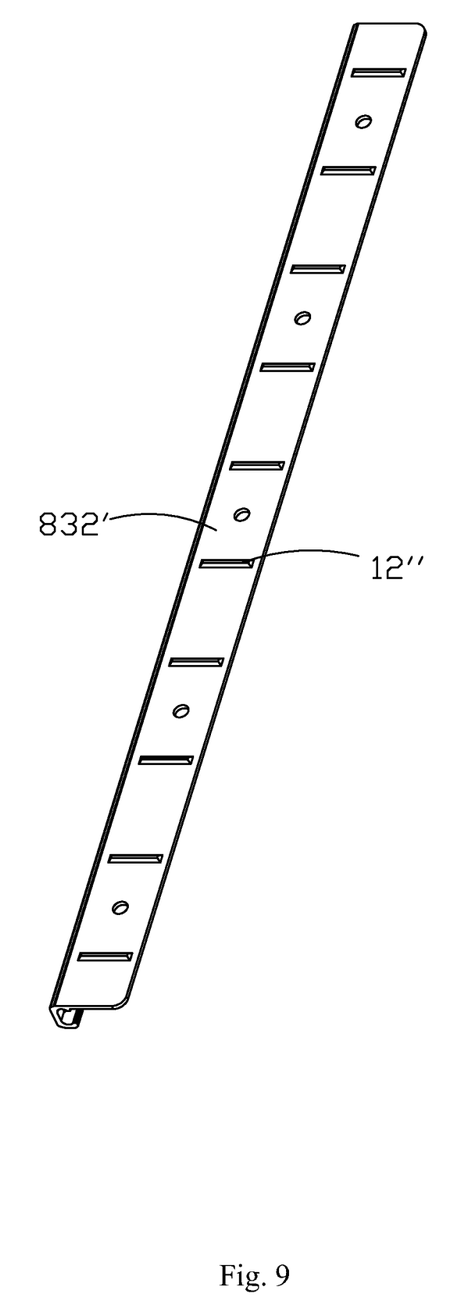
FIG. 9 is a perspective view showing a strip projection included support frame of the backlight module shown in FIG. 6.

Specifically, the projections can be dot projections (as shown in FIG. 8) or strip projections (as shown in FIG. 9).

In summary, the present invention provides a backlight module, which comprises a mounting bracket made of an aluminum material to fix a backlight source for enhancing the effect of heat dissipation and also to fix the quantum dot rail for ensuring a desired effect of fixing and reducing cost. Further, a heat isolation member is arranged between the quantum dot rail and the mounting bracket to prevent the quantum dot rail from being affected by the heat emitting from the backlight source thereby guaranteeing the life span of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane and a light guide plate, a backlight source, a mounting bracket, a quantum dot rail, a heat isolation member mounted in the backplane, the quantum dot rail being mounted through the mounting bracket between the light guide plate and the backlight source, the mounting bracket being made of an aluminum material, the heat isolation member being arranged between the quantum dot rail and the mounting bracket;
    wherein the mounting bracket comprises a heat dissipation frame and a support frame mounted to the heat dissipation frame, the backlight source being mounted to the heat dissipation frame, the quantum dot rail being mounted to the support frame; and
    wherein the support frame comprises a connection section and a mounting section perpendicularly connected to the connection section, the connection section being mounted to the heat dissipation frame, the quantum dot rail being mounted to the mounting section.

2. The backlight module as claimed in claim 1, wherein the mounting bracket comprises a bottom plate, a side plate perpendicularly connected to the bottom plate, and a mounting plate extending upward from the bottom plate at a location close to the side plate, the backlight source being mounted to the side plate, the quantum dot rail being mounted to the mounting plate, the heat isolation member being arranged between the quantum dot rail and the mounting plate.

3. The backlight module as claimed in claim 2, wherein the mounting plate comprises a vertical section perpendicularly connected to the bottom plate and a horizontal section perpendicularly connected to a free end of the vertical section, the quantum dot rail being mounted between the bottom plate and the horizontal section, the vertical section comprising a plurality of openings formed therein to correspond to the backlight source.

4. The backlight module as claimed in claim 3, wherein the heat isolation member is made of an elastic thermal insulation material and parts thereof are respectively arranged between the quantum dot rail and the horizontal section and between the quantum dot rail and the bottom plate, the heat isolation member comprising hollow cavities formed therein.

5. The backlight module as claimed in claim 4, wherein the elastic thermal insulation material comprises silicone rubber or plastics.

6. The backlight module as claimed in claim 1, wherein the heat isolation member comprises a plate-like body that is made of an elastic thermal insulation material and is arranged between the heat dissipation frame and the connection section of the support frame.

7. The backlight module as claimed in claim 6, wherein the elastic thermal insulation material comprises silicone rubber or plastics.

8. The backlight module as claimed in claim 1, wherein the heat isolation member comprises projections formed on a bottom surface of the connection section of the support frame, the projections being dot projections or strip projections.

9. A backlight module, comprising: a backplane and a light guide plate, a backlight source, a mounting bracket, a quantum dot rail, a heat isolation member mounted in the backplane, the quantum dot rail being mounted through the mounting bracket between the light guide plate and the backlight source, the mounting bracket being made of an aluminum material, the heat isolation member being arranged between the quantum dot rail and the mounting bracket;
    wherein the mounting bracket comprises a bottom plate, a side plate perpendicularly connected to the bottom plate, and a mounting plate extending upward from the bottom plate at a location close to the side plate, the backlight source being mounted to the side plate, the quantum dot rail being mounted to the mounting plate, the heat isolation member being arranged between the quantum dot rail and the mounting plate;

wherein the mounting bracket comprises a heat dissipation frame and a support frame mounted to the heat dissipation frame, the backlight source being mounted to the heat dissipation frame, the quantum dot rail being mounted to the support frame;

wherein the support frame comprises a connection section and a mounting section perpendicularly connected to the connection section, the connection section being mounted to the heat dissipation frame, the quantum dot rail being mounted to the mounting section; and wherein the heat isolation member comprises projections formed on a bottom surface of the connection section of the support frame, the projections being dot projections or strip projections.

10. The backlight module as claimed in claim 9, wherein the mounting plate comprises a vertical section perpendicularly connected to the bottom plate and a horizontal section perpendicularly connected to a free end of the vertical section, the quantum dot rail being mounted between the bottom plate and the horizontal section, the vertical section comprising a plurality of openings formed therein to correspond to the backlight source.

11. The backlight module as claimed in claim 10, wherein the heat isolation member is made of an elastic thermal insulation material and parts thereof are respectively arranged between the quantum dot rail and the horizontal section and between the quantum dot rail and the bottom plate, the heat isolation member comprising hollow cavities formed therein.

12. The backlight module as claimed in claim 11, wherein the elastic thermal insulation material comprises silicone rubber or plastics.

* * * * *